(12) United States Patent
von Blücher et al.

(10) Patent No.: US 6,184,177 B1
(45) Date of Patent: *Feb. 6, 2001

(54) METHOD OF PRODUCING ACTIVATED CARBON PARTICLES FROM SPENT GRANULAR ORGANIC ION-EXCHANGE RESIN

(75) Inventors: Hasso von Blücher, Erkrath; Ernest de Ruiter, Leverkusen, both of (DE)

(73) Assignee: MHB Filtration GmbH and Co. KG, Erkrath (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/919,429

(22) Filed: Aug. 27, 1997

Related U.S. Application Data

(63) Continuation of application No. 08/493,678, filed on Jun. 22, 1995, now abandoned, which is a continuation-in-part of application No. 08/021,430, filed on Feb. 23, 1993, now abandoned.

Foreign Application Priority Data

Feb. 28, 1992 (DE) .................................................. 42 06 132

(51) Int. Cl.⁷ ..................................................... B01J 20/02
(52) U.S. Cl. ............................... 502/434; 502/9; 502/10; 502/432; 502/433; 502/434; 423/445
(58) Field of Search ................................. 502/9, 10, 432, 502/433, 434, 180, 416, 418; 423/445 R

(56) References Cited

U.S. PATENT DOCUMENTS

| | | | | |
|---|---|---|---|---|
| 3,969,268 | * | 7/1976 | Fukuda et al. | 502/425 |
| 4,040,990 | * | 8/1977 | Neely | 528/481 |
| 4,242,226 | * | 12/1980 | Siren | 502/426 |
| 4,760,046 | * | 7/1988 | Bürger et al. | 502/437 |
| 4,839,331 | * | 6/1989 | Maroldo et al. | 502/416 |
| 4,851,285 | * | 7/1989 | Brotz | 264/29.1 |
| 4,857,243 | * | 8/1989 | Von Blucher et al. | 264/13 |

* cited by examiner

*Primary Examiner*—Stuart Hendrickson
(74) *Attorney, Agent, or Firm*—Evenson, McKeown, Edwards & Lenahan, P.L.L.C.

(57) ABSTRACT

A method of processing spent ion-exchange resins contaminated with suspended particles, inorganic residues and/or organic foreign matter so as to render the resin ineffective for continued use, by which method this waste material can be processed to produce useful activated carbon particles instead of simply being dumped in a landfill. In accordance with the invention, granular spent organic ion-exchange resin having an ash content of from 5 to 30% is first dried, then carbonized under a substantially inert atmosphere at a temperature of 300 to 900° C., the inert atmosphere containing 0.2 to 4 volume percent oxygen up to 400° C., and finally activated at a temperature of at least 700° C. under a substantially inert atmosphere containing 3 to 50 volume percent steam.

15 Claims, No Drawings

METHOD OF PRODUCING ACTIVATED CARBON PARTICLES FROM SPENT GRANULAR ORGANIC ION-EXCHANGE RESIN

RELATED APPLICATIONS

This is a continuation of abandoned application Ser. No. 08/493,678, filed Jun. 22, 1995, now abandoned, which is a continuation-in-part of Ser. No. 08/021,430, filed Feb. 23, 1993, now abandoned.

FIELD OF THE INVENTION

The invention relates to a method of providing activated carbon particles from spent contaminated synthetic resin ion-exchangers which mostly occur in granular form.

BACKGROUND OF THE INVENTION

Synthetic resin ion-exchangers are porous polymers having numerous chemical groups with exchangeable ions. In general, they consist of a copolymer framework of styrene and divinylbenzene or styrene and acrylic acid, said framework carrying acid groups, in particular sulfonic acid groups, for cation-exchangers and basic groups (amines) for anion-exchangers. Organic ion-exchangers of the kind having a polymer resin matrix selected from the group consisting mainly of polystyrene resins, polyacrylic resins, polyalkyl amine resins or phenol-formaldehyde resins, which may be present as cation- or anion-exchange resins, depending on their functional groups, and adsorbent resins are described in Ullmann's Encyclopedia of Industrial Chemistry, Fifth Edition, Volume A 14, VCH-Verlagsgesellschaft mbH, Weinheim, Germany 1989 in the chapter "Ion Exchangers", in particular on pages 394–398, and are commercially available under the trade names Lewatit, Dowex, Kastel, Diaion, Relite, Purolite, Amberlite, Duolite, Imac, Ionac, Wofatit. Numerous applications of the ion-exchange resins are also described on pages 399–448 of the cited chapter.

The main purpose of using ion-exchangers is the exchange of undesirable ions present in water for less noxious ions, and the complete removal of ions. If the ions that produce hardness—basically, $Ca^{2+}$ and $Mg^{2+}$—are exchanged for $Na^+$ ions, "hard" water becomes "soft" water. If cations and anions are removed, one obtains demineralized water. Soft water is necessary, for example in the textile industry, and demineralized water in the steam generation, in particular in high-pressure boilers.

In general, ion-exchangers become ineffective by obstruction, i.e. their pores become blocked by suspended particles or inorganic residues, such as iron to compounds. The latter are regularly flushed out, but with time, more pores become progressively blocked and finally the bed has to be replaced. At this point, the problem of disposal of the ion-exchanger arises. As long as no ions that polute the environment are present, the spent ion-exchangers can be disposed of in waste dumps.

Inactive granular organic ion-exchange resins are contaminated with large amounts of inorganic or organic foreign matter, such as suspended particles of all kinds, sludge, microorganisms, algae and various cations, e.g. sodium, potassium, iron, and calcium ions. The amount of these impurities is usually up to 20% by weight, based on the dry substance. The granular ion-exchange resins to be disposed of have in most cases a water content which may amount to up to 50% by weight.

SUMMARY AND DETAILED DESCRIPTION OF THE INVENTION

Subject matter of the invention is a method for the disposal of spent granular organic ion-exchangers of the afore-mentioned kind comprising carbonizing the spent ion-exchanger in a predominantly inert atmosphere at temperatures of from 300° C. to 900° C. and subsequently activating the carbonized material in an oxidizing atmosphere, thus converting the spent ion-exchangers into activated carbon spheres.

It is known in the art to convert specifically defined, polysulfonated macroporous cross-linked vinyl aromatic polymers into carbonaceous adsorber particles by heating to temperatures of up to 1200° C. (U.S. Pat. No. 4,957,897). The sulfonic acid groups are released during pyrolysis, radical sites are generated which lead to strongly cross-linked structures that are not meltable and contain little volatile carbon.

However, it was surprising that high quality abrasionproof activated carbon spheres can be produced also from heavily contaminated spent synthetic resin ion-exchangers by pyrolysis and that the various foreign substances contained therein do not impair the quality and stability of the activated carbon. Surprisingly enough, the macro- and mesopore structure of the feedstock is maintained during the disintegration of the impurities and the carbonization. The accumulated organic and biological products are destroyed or escape without forming any pronounced carbon residues, in particular if the carbonization is conducted in a weakly oxidizing atmosphere.

In spent cation-exchange resins, the cations are usually bonded to sulfonic acid groups and are substantially converted into sulfates at temperatures of up to 400° C. At higher temperatures, they are reduced by carbon, resulting in considerable amounts of sulfides. It is, therefore, advantageous to first convert cation-exchange resins into the $H^+$ form prior to carbonization. This is preferably done by washing the still moist material with an acid, i.e. prior to drying.

In order to remove the water content, which as already mentioned may amount to up to 50% of the granular organic ion-exchange resin, it is recommended to dry the spent granular resin to be disposed of, preferably in a rotary drier or in a fluidized bed. Prior to attaining the softening point and usually after the drying, the synthetic resin ion-exchangers are preferably mixed ("powdered") with an inert inorganic powder, preferably carbon powder, to prevent agglomeration and to maintain the granular structure during the entire treatment.

Up to a temperature of 400° C., preferably up to about 300° C. to 350° C., the inert atmosphere of the carbonization step can contain 0.2 to 4 volume % oxygen. The oxygen content is preferably controlled by the addition of air. This preoxidation is recommended not only because of the presence of organic impurities, but also, in connection with the addition of carbon powder and/or a slow rise in temperature which also occurs during the carbonization of gel-type ion-exchangers. In particular, the preoxidation is very important when the resins do not contain sulfonic acid groups, e.g. with anion-exchange resins or adsorbent resins this preoxidation converts the carbon spheres into a non-volatile form. It is recommended to process these resin types together with cation-exchange resins containing sulfonic acid groups.

Minor amounts of cations, such as alkali metal and alkaline earth metal ions, e.g. sodium, potassium etc. or calcium, which were already converted into sulfates at the beginning of the pyrolysis, do not disturb the carbonization and activation, surprisingly enough, they even promote the activation step.

The spent ion-exchange resins of the present invention have an ash content that is generally in the range of from 1–30% and, preferably from 5–10% but always larger than about 1%. Since the ash contains alkaline salts as already mentioned, the activated carbon product in accordance with the present invention is particularly suitable for adsorption of acidic gases.

The activation of the carbonized material follows upon the carbonization at about 700° C. Analogous to the carbonization, it can be conducted in a rotary drier or even better in a fluidized bed. To activate the material, steam and/or carbon dioxide is added in an amount of 3 to 50, preferably 3 to 15 volume %, to the substantially inert atmosphere. The activation temperature can be up to 900° C. To save energy, the activation can be conducted in the same apparatus after the carbonization. However, it might be advantageous for specific technical and procedural reasons to conduct the activation in an independent separate step, all the more since the carbonization up to temperatures of about 500° C. already entails a considerable shrinkage and a weight loss of the feedstock of from 60 to 90%. The carbon content of the activated carbon spheres after activation is more than 90% by weight.

EXAMPLE 1

1 kg of a macroporous ion-exchanger consisting mainly of styrene and divinylbenzene, which was present in the $H^+$ form, and was used in the synthesis of fuel additives (MTBE) and had become inactive, was dried in a rotary drier at 110° C. The loss in weight, caused by the vaporization of hydrocarbons and some moisture, was approximately 13%. Thereafter, it was heated up to 300° C. in an atmosphere consisting of 80% inert gas and 15% air and maintained therein for one hour. The gain in weight was about 8%. Thereafter the temperature was raised to 700° C. in inert atmosphere within hours. 5% steam were added in the range of 700° C. to 900° C. The temperature rise from 700° C. to 820° C. lasted for thirty minutes, the 900° C. were attained in ten further minutes. The yield was 28%, based on the feedstock. An agglomeration of the spheres did not occur at any time. A shrinkage of diameter of from approximately 0.8 mm to 0.6 to 0.7 mm, was observed. The apparent density of the spheres was 1.08 g/cm$^3$ at a pore volume of more than 0.9 ml/g, of which 0.55 ml/g were micropores. A specific surface of 1088 m$^2$/g was determined by the BET method. A 0.55 mm sphere could be loaded punctiform with 300 g without breakage.

EXAMPLE 2

1 kg of a gel-type cation-exchanger which had been used for the softening of water and had no sufficient activity was converted into the $H^+$ form by means of a hydrochloric acid solution. After superficial air drying, the moisture was about 50%. After drying at 110° C., oxidation was carried out in air at 300° C. for 6 hours. The procedure of Example 1 was thereafter applied. The yield was 31%, based on the feedstock. The spheres were partly agglomerated.

EXAMPLE 3

The process of Example 2 was applied in the same manner and with the same feedstock, however, after oxidation at 300° C., powdering was conducted with 5%, carbon powder and the temperature was raised to 700° C. within 6 hours. The agglomeration of the spheres and the formation of a blistered structure could thus be prevented. The inner surface of the obtained activated carbon particles amounted to approximately 100 Om$^2$l/g (BET). The yield was 40% based on the feedstock. The average bursting pressure was 250 g at a diameter of 0.5 mm.

Macroporous adsorbent resins consisting mainly of a divinylbenzene-copolymer were processed in the same manner to yield activated carbon. The resins had been already spent and still contained adsorbed organic substances. Since these products do not contain any sulfonic acid groups, a preoxidation is particularly important.

What is claimed:

1. A method of producing activated carbon particles from a granular spent organic gel ion-exchange resin containing at least one of suspended particles, inorganic residues and organic foreign matters so as to render the exchange resin ineffective, said method comprising;
   a. drying said granular spent organic gel ion-exchange resin having an ash content in the range of from 5–30%;
   b. carbonizing said spent gel ion-exchange resin in a substantially inert atmosphere at a temperature of from 300° C. to 900° C., the inert atmosphere containing 0.2 to 4 volume % of oxygen up to a temperature of 400° C.; and
   c. activating the carbonized ion-exchange resin in a substantially inert atmosphere containing 3 to 50 volume % of steam at a temperature of at least 700° C.

2. A method according to claim 1, wherein the ion-exchange resin is cationic.

3. The method according to claim 2, wherein said spent organic ion-exchange resin contains contaminant ions selected from the group consisting of calcium, magnesium, iron, sodium and potassium.

4. The method according to claim 3, wherein said ions are present in an amount of up to 20% by weight based on the dry resin.

5. The method according to claim 2, wherein the resin consists of sulfonated styrene-divinyl-benzyl copolymers or styrene-acrylic acid copolymers.

6. The method according to claim 2, wherein the cationic resin is in the $H^+$ form.

7. The method according to claim 1, wherein the ion-exchange resin is anionic.

8. The method according to claim 5, wherein the resin consists of polystyrene resins or polyacrylic resins with tertiary or quaternary amino groups.

9. The method according to claim 8, wherein said resin is a granular adsorbent resin.

10. The method according to claim 1, wherein the temperature of step b is 300° C. to 350° C.

11. The method according to claim 1, wherein said atmosphere of step c contains to 15 volume % of steam.

12. The method according to claim 1, wherein the activation step is performed in a separate apparatus.

13. The method according-to claim 1, comprising the additional step of adding an inert inorganic powder to said resin prior to step (a).

14. The method according to claim 13, wherein the inert powder is carbon.

15. The method according to claim 1, wherein the treatment steps are performed in fluidized bed or in a rotary drier.

* * * * *